US005954809A

United States Patent [19]
Riley et al.

[11] Patent Number: 5,954,809
[45] Date of Patent: *Sep. 21, 1999

[54] CIRCUIT FOR HANDLING DISTRIBUTED ARBITRATION IN A COMPUTER SYSTEM HAVING MULTIPLE ARBITERS

[75] Inventors: Dwight D. Riley, Houston, Tex.; James R. Edwards, Longmont, Colo.; David J. Maguire, Spring, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,412

[22] Filed: Jul. 19, 1996

[51] Int. Cl.[6] .................................................. G06F 13/368
[52] U.S. Cl. ......................... 710/119; 710/101; 710/113; 710/120
[58] Field of Search ..................................... 395/299, 300, 395/304, 293, 297, 281; 710/119, 120, 124, 113, 117, 101, 102, 103

[56] References Cited

U.S. PATENT DOCUMENTS

| | | | |
|---|---|---|---|
| 4,314,335 | 2/1982 | Pezzi ...................................... | 395/731 |
| 4,473,880 | 9/1984 | Budde et al. .......................... | 395/292 |
| 4,493,022 | 1/1985 | Nicholas et al. ...................... | 395/296 |
| 4,602,327 | 7/1986 | Laviolette et al. . | |
| 4,663,756 | 5/1987 | Retterath . | |
| 4,755,938 | 7/1988 | Takahashi et al. . | |
| 4,760,515 | 7/1988 | Malmquist et al. ................... | 395/301 |
| 4,785,394 | 11/1988 | Fisher . | |
| 4,980,854 | 12/1990 | Donaldson et al. . | |
| 4,987,529 | 1/1991 | Craft et al. . | |
| 5,067,071 | 11/1991 | Schanin et al. . | |
| 5,083,260 | 1/1992 | Tsuchiya . | |
| 5,127,089 | 6/1992 | Gay et al. . | |
| 5,151,994 | 9/1992 | Willie et al. .......................... | 395/725 |
| 5,191,656 | 3/1993 | Forde, III et al. . | |
| 5,239,631 | 8/1993 | Boury et al. . | |
| 5,265,223 | 11/1993 | Brockmann et al. . | |
| 5,301,282 | 4/1994 | Amini et al. . | |
| 5,317,696 | 5/1994 | Hilgendorf . | |

(List continued on next page.)

FOREIGN PATENT DOCUMENTS

| | | |
|---|---|---|
| 0432978A2 | 6/1991 | European Pat. Off. . |
| 0537899A1 | 4/1993 | European Pat. Off. . |
| 0559409A1 | 9/1993 | European Pat. Off. . |
| 4192056 | 7/1992 | Japan . |

OTHER PUBLICATIONS

IBM Technical Bulletin, Jul. 1991.
Intel® 82420/82430 PCIset ISA and EISA Bridges, pp. 1–5; 17, 35, 37, 148, 154–157, 172–174, 211, 225–226, 293–302, 320–321, 345, 363–364, 438–444, 460–462, Mar. 1993.
PCI Specification, A100910–940, p. 11, 1993.
PCI Specification, A100910–940, pp. 2–5 to 2–12, 1993.
PCI Specification, A100190–940, pp. 55–73, 1993.

*Primary Examiner*—Ayaz R. Sheikh
*Assistant Examiner*—Ario Etienne
*Attorney, Agent, or Firm*—AKin, Gump, Strauss, Hauer & Feld

[57] ABSTRACT

An arbitration scheme for a computer system having multiple arbiters for arbitrating access to a plurality of buses. In the preferred embodiment, a computer system is divided into a detachable laptop portion and an expansion base unit coupled through a shared PCI bus. Each of the two portions of the computer system includes separate PCI arbitration circuitry for arbitrating requests for the PCI bus from potential PCI and ISA bus masters. Included within the laptop portion of the computer system is a top level arbiter that determines whether the PCI arbiter in the laptop or expansion base unit has access to the PCI bus. Either PCI arbiter normally must receive a grant from the top level arbiter before it runs a cycle. While the laptop computer is docked, the top level arbiter selects between the PCI arbiters on an essentially time multiplexed basis. While the expansion base and laptop computer are undocked, the top level arbiter grants bus access to the laptop PCI arbiter.

18 Claims, 9 Drawing Sheets

U.S. PATENT DOCUMENTS

| | | |
|---|---|---|
| 5,388,228 | 2/1995 | Heath et al. . |
| 5,396,602 | 3/1995 | Amini et al. . |
| 5,418,920 | 5/1995 | Kuddes . |
| 5,438,666 | 8/1995 | Craft et al. . |
| 5,471,590 | 11/1995 | Melo et al. . |
| 5,524,217 | 6/1996 | Sone et al. ............................... 395/306 |
| 5,524,235 | 6/1996 | Larson et al. . |
| 5,528,766 | 6/1996 | Ziegler et al. . |
| 5,557,754 | 9/1996 | Sone et al. ............................... 395/287 |
| 5,596,729 | 1/1997 | Lester et al. ............................ 395/308 |
| 5,708,784 | 1/1998 | Yanai et al. ............................. 395/299 |
| 5,724,529 | 3/1998 | Smith et al. ............................ 395/309 |
| 5,734,850 | 3/1998 | Kenny et al. ........................... 395/309 |

CIRCUIT FOR HANDLING DISTRIBUTED ARBITRATION IN A COMPUTER SYSTEM HAVING MULTIPLE ARBITERS

BACKGROUND OF THE INVENTION

1. Field of the Invention

The invention relates to bus arbitration in a computer system, and more particularly to a distributed arbitration scheme in a computer system having multiple peripheral arbiters.

2. Description of the Related Art

Performance improvements in microprocessor and memory systems have resulted in computers so powerful that they are now capable of performing tasks that before could only be performed by large mainframe computers. Technological change has been especially swift in the area of portable computers, where power consumption efficiency is balanced against features, cost, size, weight and performance. Such balancing can be particularly challenging since many computer users desire the portable computer to provide nothing less than what a desktop unit can provide. In this specification, the term "portable computers" is used broadly to denote the class of computers powered by battery or solar power. Those familiar with portable computers will recognize other labels such as: luggable, laptop, notebook and handheld. These categorizations are used to designate certain marketing segments of the larger portable computer market.

Many options are available to the computer system designer. While simply designing around the highest performance processor available will go a long way towards providing a high performance product, it is not enough in today's market. The processor must be supported by high performance components and a high performance I/O (input/output) bus. Several standardized I/O buses are available to the system designer including: ISA (Industry Standard Architecture); EISA (Extended Industry Standard Architecture); and PCI (Peripheral Component Interface). Today's computers are typically designed with some combination of the three to provide the user with the performance of PCI and backward compatibility to ISA or EISA. These three buses are familiar to those skilled in the art.

Design choices also involve certain special features of the computer that distinguish one manufacturer's computer from a competitor's. In the portable computer market this is especially challenging since added features can result in increased size and weight. For example, software can require large amounts of storage, and a high capacity hard disk drive is often necessary. High capacity disk drives, however, are usually much larger and heavier than desirable for a portable computer. It is also desirable to have the ability to add functionality to the portable computer. Typical expansion bays, though, can compromise a system's size advantages.

One known method of providing extra features without negatively impacting size and weight is through the use of an expansion base unit (also referred to as a docking station). An expansion unit is a non-portable unit that typically operates from AC power and resides on the user's desktop. When the user is working at the desk, the portable computer plugs into the expansion unit to provide added functionality. For example, the expansion unit may have a network interface unit for connecting to a local area network, a high capacity disk drive, a floppy drive and other peripherals.

The connection between the portable computer and the expansion base unit is typically proprietary since no standard has yet evolved. One known way to couple the portable computer to the expansion base unit is through the existing I/O bus. In a portable computer having a PCI bus and an ISA bus, either bus might be used to connect to the expansion base unit. For highest performance, the PCI bus is preferable.

The PCI bus was designed to have a high throughput and to take advantage of an increasing number of local processors supporting I/O functions. For example, most disk controllers, particularly Small Computer System Interface (SCSI) controllers, and network interface cards (NICs) include a local processor to relieve demands on the host processor. Similarly, video graphics boards often include intelligent graphics accelerators to allow higher level function transfer. Typically these devices incorporate the capability to act as bus masters, allowing them to transfer data at the highest possible rates. Other potential bus masters include the CPU/main memory subsystem and a PCI-ISA bridge. The PCI-ISA bridge is the means by which an enhanced direct memory access (EDMA) controller and ISA bus masters can gain access to the PCI bus.

Because of the number of devices potentially vying to become bus masters, an arbitration scheme is required. The PCI specification does not lay down a model algorithm for the arbitration; it only requires that a PCI bus master must activate the REQ* signal to indicate a request for the PCI bus, and the arbitration logic must activate the GNT* signal so that the requesting master can gain control of the bus. Numerous arbitration schemes have been used in or proposed for typical stand-alone desktop computer systems.

One such arbitration scheme is described in commonly assigned U.S. Pat. No. 5,471,590 entitled "Bus Master Arbitration Circuitry Having Improved Prioritization," which is hereby incorporated by reference. The '590 patent describes an arbiter for the PCI bus which minimizes thrashing on a bus due to a retry generated by a target device. According to the PCI standard, responding target devices may abort a cycle by generating a retry to the bus master. By aborting the operation, other bus masters are allowed to gain access to the bus while the target device that generated the retry is given the opportunity to clear the condition that caused it to issue the retry. The arbiter described in the '590 application masks further requests from the retried master to prevent thrashing of the bus. The high priority of the masked request is maintained, however, in subsequent cycles. Other arbiters are also disclosed for performing arbitration for other resources. The multiple arbiters worked together to arbitrate access to the PCI bus as well as an EISA bus and DMA controller.

Another improved arbitration scheme for systems incorporating multiple buses is described in commonly assigned U.S. patent application Ser. No. 08/398,366, entitled "Bus Master Arbitration Circuitry Having Multiple Arbiters," filed on Mar. 3, 1995 and whose contents are also hereby incorporated by reference. This reference describes a PCI bus having a plurality of bus masters, including a CPU/main memory subsystem and a PCI-ISA bridge. The disclosed PCI-ISA bridge allows an enhanced DMA (EDMA) controller and ISA bus masters to gain access to the PCI bus. The EDMA controller controls main memory accesses by IDE or similar devices. Preferably, a command cycle is generated on the PCI bus to notify the EDMA controller if a disk write or disk read is desired. In response, the EDMA controller asserts the proper command strobes to the selected IDE device. The transfer of data between the selected IDE device and the PCI bus is accomplished via the data portion of the ISA bus. The ISA bus masters include a refresh controller, a DMA controller, and ISA bus master cards.

Thus, application Ser. No. 08/398,366, now U.S. Pat. No. 5,596,729, discloses a PCI arbiter for arbitrating requests for the PCI bus from potential bus masters. The PCI arbiter utilizes a modified least-recently-used (LRU) arbitration scheme. Further, the data portion of the ISA bus has an arbiter for handling requests from the EDMA controller, the refresh controller, the DMA controller, one of the PCI masters in a PCI-to-ISA cycle, and one of the ISA bus masters. The priority of the ISA bus masters is arbitrated through a plurality of channels in the DMA controller. The arbiter in the DMA controller also includes logic that performs an alternating priority scheme based on the type of requestor for the ISA bus. The reference discloses two requestor types: a first type including the DMA controller and ISA bus masters, and a second type including the other devices, i.e., the EDMA controller, the refresh controller, and the PCI bus masters. Once the first requestor type (DMA controller or ISA bus master) gains control of the ISA bus, it loses access to the ISA bus in the next arbitration cycle. This forces the DMA controller or ISA bus masters to give up the ISA bus in the next arbitration cycle.

The aforementioned arbitration schemes provide effective arbitration in stand-alone computer systems. Difficulties arise, however, when a portable computer containing arbitration circuitry is connected via an I/O bus to an expansion base (or other portable computer) also employing a multiple bus architecture and requiring separate arbitration capability.

SUMMARY OF THE INVENTION

A computer system according to the present invention includes multiple arbiters for arbitrating access to a plurality of buses. In the preferred embodiment, a computer system is divided into a detachable laptop portion and an expansion base unit. When attached ("docked"), the laptop computer and expansion base are coupled through a shared PCI bus. In addition to a PCI bus, each of the two portions of the computer system also include either an ISA or an EISA compliant I/O bus, as well as separate and distinct PCI arbitration circuitry for arbitrating requests for the PCI bus from potential PCI and ISA bus masters.

A top level arbiter is included in the laptop portion of the computer system, and that top level arbiter essentially controls whether the PCI arbiter in the laptop or the PCI arbiter in the expansion base has access to the PCI bus. Either PCI arbiter must receive a grant from the top level arbiter before it runs a cycle. While the laptop computer is docked, the top level arbiter selects between the laptop PCI arbiter and the expansion base PCI arbiter, basically on a time multiplexed basis. When the expansion base and laptop computer are undocked, the top level arbiter always grants bus access to the laptop PCI arbiter.

The laptop PCI arbiter requests bus access using a laptop request signal to the top level arbiter, and then is granted bus access by the top level arbiter using a laptop grant signal. These signals are self-contained within the laptop computer. The expansion base PCI arbiter similarly sends and receives expansion request and grant signals, which are communicated between the laptop computer and expansion base. These are the only two signals the top level arbiter uses to communicate with the expansion base arbiter. Thus, using a top level arbiter to determine whether the laptop PCI arbiter or the expansion base PCI arbiter has access to a shared PCI bus allows the use of fewer pins in the connection between the laptop unit and the expansion unit.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,486, entitled "BUS SYSTEM FOR SHADOWING REGISTERS," by Dwight D. Riley and David J. Maguire, filed concurrently herewith;

U.S. application Ser. No. 08/684,485, entitled "LONG LATENCY INTERRUPT HANDLING AND INPUT/OUTPUT WHILE POSTING," by David J. Maguire and James R. Edwards, filed concurrently herewith;

U.S. application Ser. No. 08/684,710, entitled "SERIAL BUS SYSTEM FOR SHADOWING REGISTERS," by David J. Maguire and Hung Q. Le, filed concurrently herewith;

U.S. application Ser. No. 08/685,584, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316, entitled "TWO ISA BUS CONCEPT," by Gregory N. Santos, James R. Edwards, Dwight D. Riley and David J. Maguire, filed concurrently herewith;

U.S. application Ser. No. 08/684,490, entitled "RECONFIGURABLE DUAL MASTER IDE INTERFACE," by Gregory N. Santos, David J. Maguire, William C. Hallowell and James R. Edwards, filed concurrently herewith; and U.S. application Ser. No. 08/684,255, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
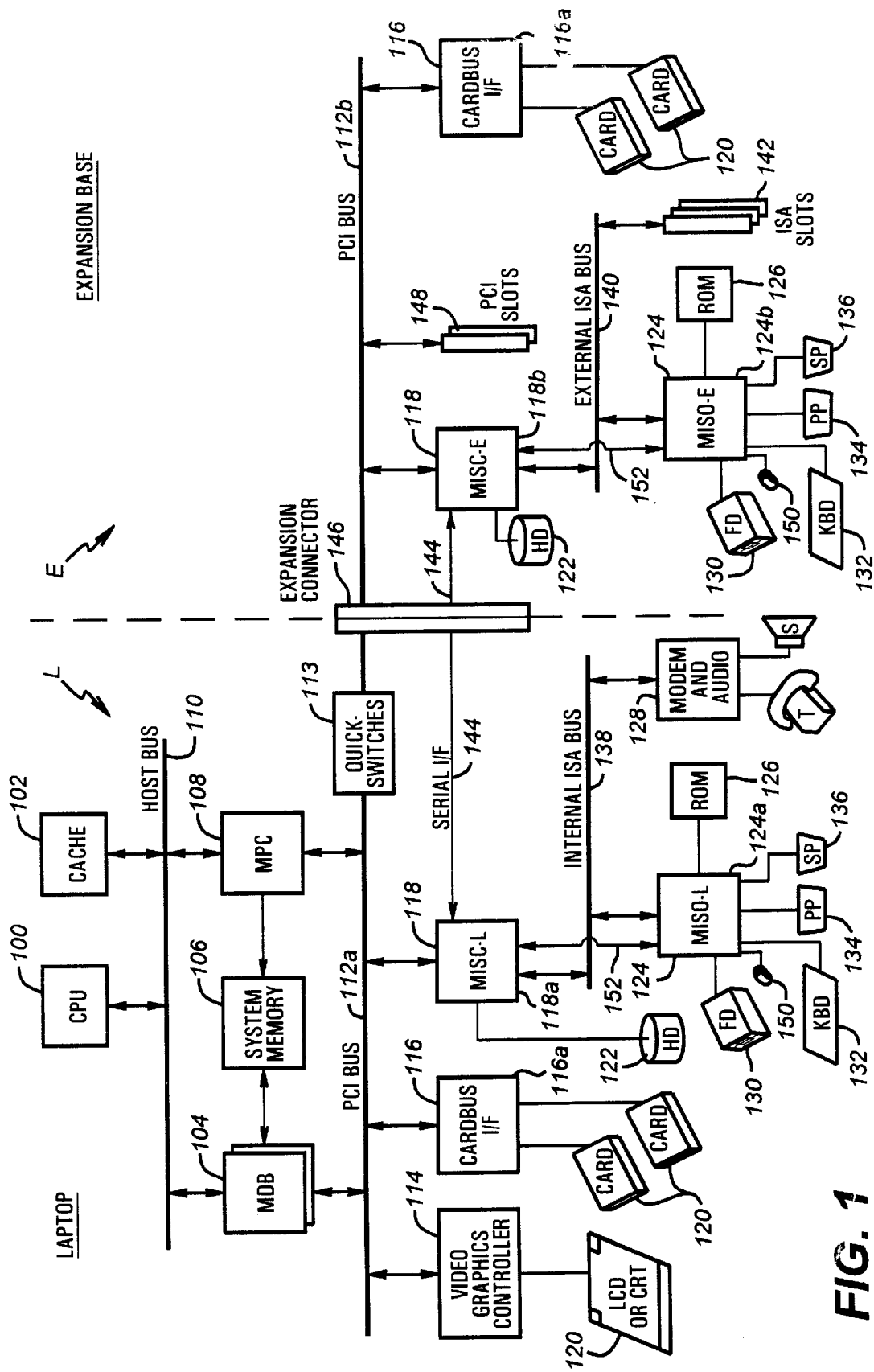
FIG. 1 is a block diagram of an exemplary computer system including arbitration logic according to the present invention.

Referring now to FIG. 1, there is illustrated a block diagram of a computer system utilizing the present invention. The computer system is shown divided into a laptop portion L (hereinafter laptop computer L) and an expansion base unit portion E (hereinafter expansion base E). The laptop computer L is an operationally autonomous apparatus which is detachable from the expansion base E for remote computing operations. While the laptop computer L is docked into the expansion base E, the laptop computer L operates on AC power. When computer L is detached from the expansion base E, the laptop computer L operates from battery power. Mechanisms are also provided to operate the laptop computer from AC power while removed from the expansion base E. The expansion base E typically provides expendability for functions not included in the laptop portion L due to space or power concerns.

A Central Processing Unit (CPU) 100 is provided in the laptop computer L which is a conventional microprocessor such as the Pentium™ from Intel Corporation or a similar processor. The CPU 100 couples to a host bus 110 for communicating with system logic such as a cache memory 102, a Mobile Peripheral Component interconnect bus cache controller (MPC) 108 and pair of Mobile Data Buffers (MDB) 104. The cache memory 102 is a conventional cache memory for the CPU 100 and preferably employs high speed synchronous burst static Random Access Memory (RAM). The MPC 108 provides an interface to the cache memory 102, and includes tag RAMs and other logic for creating various cache ways, size, and speed configurations of the cache memory 102.

The MPC 108 and the MDB 104 are also coupled to a system memory 106 and a peripheral component interconnect (PCI) bus 112. One skilled in the art would be familiar with the PCI bus or the PCI specification. The MPC 108 provides address and control to system memory 106, which is comprised of up to 256 MByte of conventional dynamic random access memories (DRAMs). The MDB 104 provides a 64-bit data path between the host bus 110 and the system memory 106 and provides a 32-bit data path to the PCI bus 112. The MPC 108 and MDB 104 have three major functional interfaces: a processor/cache interface, a system memory interface, and a PCI bus interface. The MDB 104 is responsible for buffering data between the three interfaces while the MPC 108 is responsible for handling addressing, command and control. Each of these interfaces operate independently from the other and includes queues for read and write posting between any two of the three interfaces. The processor/cache interface allows the CPU 100 to pipeline cycles into read cycles and allows snoop accesses to the tag RAM to occur while the pipeline cycles are executing. The memory interface controls the system memory 106 and generates control signals to the MDB 104. The interface also allows read ahead operations for those PCI masters issuing a read multiple command. The PCI interface allows MPC 108 to act as a PCI master when the CPU 100 is accessing the PCI bus 112, or as a PCI slave when a PCI device accesses system memory 106.

The PCI bus 112 provides a communications conduit between the laptop computer L and the expansion base E. A portion 112a of the PCI bus 112 resides in the laptop computer L and includes a Quickswitch 146 for each signal of the PCI bus 112. The Quickswitches 146 are low loss series in-line MOSFET devices with the gate (control line) connected to a docking detection means for providing hot plug capabilities. When the laptop computer L is docked into the expansion base E and the Quickswitches 146 are turned on, a portion 112b of the PCI bus 112 in the expansion base E is coupled to the portion 112a to provide the extended PCI bus 112.

In the laptop computer L, the PCI bus 112a further couples to a video graphics controller 114, a Cardbus interface 116 (particularly 116a) and a Mobile Integrated System Controller—Laptop 118 (particularly MISC-L 118a). In the expansion base E, the PCI bus 112b further couples to a second MISC 118 (MISC-E 118b), two PCI slots 148, and a second Cardbus interface 116 (particularly 116b). The video graphics controller 114 further couples to a low power liquid crystal display (LCD) 120 or alternatively a cathode ray tube (CRT) or any other style monitor. The Cardbus interface 116 is provided for communicating with add-on cards 120 such as networking cards, modem cards, solid state storage cards and rotating storage cards preferably of a Personal Computer Memory Card International Association (PCMCIA) style. The MISC 118 provides an interface for an Industry Standard Architecture (ISA) bus 138 or 140, and an integrated drive electronics (IDE) hard drive interface for communicating with hard drives 122. The MISC 118 is configurable based on an input pin (LAP_EXT$_{13}$) for use in both the laptop computer L, as MISC-L 118a, and expansion base E, as MISC-E 118b. Thus, two MISC devices, 118a and 118b are coupled to the PCI bus 112, with MISC-L 118a coupled to the PCI bus portion 112a and MISC-E 118b coupled to PCI bus portion 112b. MISC-L is further coupled to the internal ISA bus 138 while MISC-E is coupled to the external ISA bus 140. One skilled in the art would be familiar with the ISA bus.

The general functioning of MISC-L 118a and MISC-E 118b is very similar, and they are discussed together for sake of simplicity. The MISC 118 bridges the PCI bus 112 to the ISA bus 138 or 140 and acts as both a master and slave on the PCI bus 112 and a bus controller on the ISA buses 138 or 140. The MISC 118 further includes bus arbitration circuitry, including a PCI bus arbiter and an ISA bus arbiter, as well as 8237 compatible direct memory access (DMA) controllers, an enhanced DMA controller for fast IDE hard drives, 8254 compatible timers, an 8259 compatible interrupt controller, hot docking support logic, system power management logic, and plug and play support (not all shown in FIG. 1). Some components are disabled upon initialization by software to prevent conflicts or duplication. The MISC 118 also includes a serial interrupt interface 144 for serially passing interrupts from the MISC-E 118b to the MISC-L 118a. The serial interrupt interface 144 provides an interrupt architecture for supporting standard ISA interrupts in a PCI based system. Of interest in this application, an expansion base PCI request signal EXP_REQ and an expansion base PCI grant signal EXP_GNT are also passed between MISC-E 118b and MISC-L 118a. The MISC-E 118b uses the EXP_REQ and EXP_GNT signals to request and receive control of the PCI bus 112. These signals are discussed in more detail in conjunction with FIG. 4. These two signals are shown as part of the serial interrupt interface 144 for sake of simplicity, but are physically communicated over separate lines.

The MISC 118 and the ISA buses 138 and 140 provide support for standard ISA peripherals such as those combined in a Mobile Super Input/Output (MSIO) 124 peripheral. The MSIO 124 peripheral has a combination of standard ISA peripherals, such as: a 146818 compatible real time clock (RTC), a floppy controller for interfacing to standard floppy drives 130; an 8051 compatible microcontroller for communicating with a standard keyboard 132 and pointing device 150, for performing scanning and key code conversions on the keyboard 132, and for performing power management functions; a universal asynchronous receiver transmitter (UART) for providing standard serial ports 136; and parallel port logic for a parallel port 134. A read only memory (ROM) 126 couples to the MSIO 124 for providing code to the 8051 microcontroller. Additionally, the ROM 126 provides basic input/output services (BIOS) code to the CPU 100, which is copied from the ROM 126 and shadowed in system memory 106 upon system initialization so that thereafter the 8051 microcontroller may access the ROM 126. A serial bus 152 is provided for shadowing registers containing information relating to power management and hot docking.

In the laptop computer L, a modem and audio peripheral 128 is also provided and coupled to the ISA bus 138. The modem and audio peripheral 128 includes a standard telephony communications port for coupling to a telephone T, and an interface for coupling to a pair of stereo speakers S. In the expansion base E, three ISA expansion slots 142 are provided for standard ISA cards.

This is an exemplary computer system L and E and other variations could readily be developed by one skilled in the art. It is contemplated that additional lower level arbiters could be coupled to the shared bus, such that the top level arbiter arbitrates between more than two lower level arbiters. For example, adding additional laptop computers L to the expansion base or adding PCI bus bridges might require this additional level of arbitration.

Basic PCI Arbitration

The PCI specification includes two control signals for arbitration: REQ* and GNT*. Each potential busmaster has its own unique request and grant signal, which are intercepted and used by the central arbitration logic. The PCI specification only requires that a PCI busmaster must activate the REQ* signal to indicate a request for the PCI bus, and the arbitration logic must activate the GNT* signal so that the requesting master can gain control of the bus. Only a single GNT* signal may be asserted on any clock. The busmaster must then begin a bus transfer within 16 CLK cycles of an "idle" PCI bus.

PCI bus arbitration is performed separately for each access to the bus. A busmaster is not allowed to hold up the PCI bus between two accesses (this may occur with EISA). For this reason, a PCI burst, which represents a single access in the sense of bus arbitration, can extend over any number of transfer cycles. However, this single arbitration does not impair the transfer bandwidth of the PCI bus because the arbitration is "hidden" behind the active bus. This means that the arbitration is already being performed if the active bus access is still running. In this way, no PCI bus cycles are required for arbitration, except when the bus is idle. A more detailed description of the structure and operation of the PCI bus and basic arbitration signaling protocol is provided in "Peripheral Component Interconnect (PCI) Local Bus Specification, Revision 2.1 Production Version," published Jun. 1, 1995; and "Preliminary PCI System Designs Guide" Revision 1.0, published Sep. 8, 1993, both by the PCI Special Interest Group, the contents of which are hereby incorporated by reference as if they were fully set forth.

Distributed Arbitration

Figure 2:
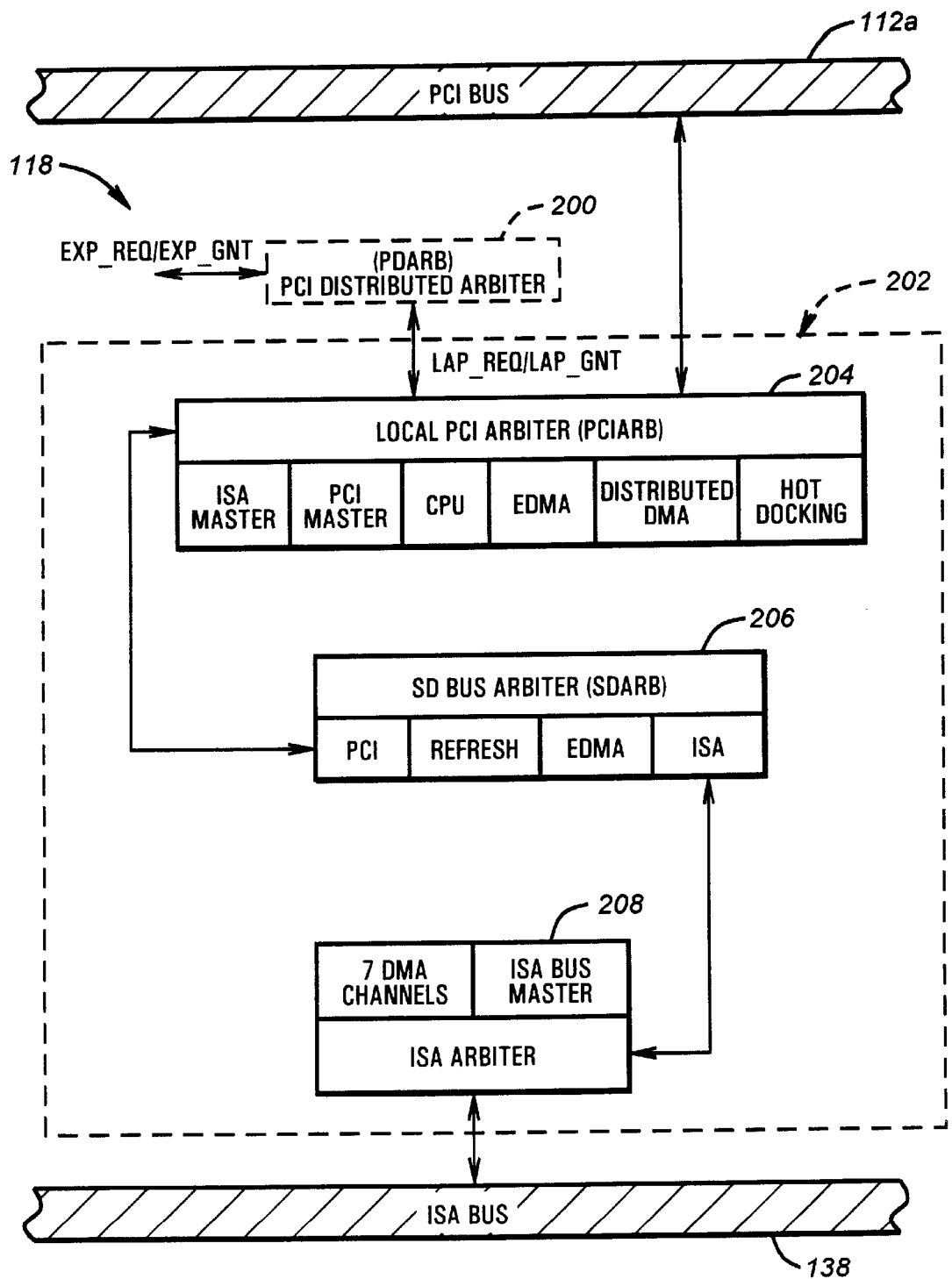
FIG. 2 is a block diagram of arbitration logic according to the present invention, the logic being incorporated within a PCI-ISA bridge of the computer system of FIG. 1.

Referring now to FIG. 2, a block diagram of arbitration logic according to the present invention is shown. As mentioned, the arbitration logic is incorporated within the MISC 118 (PCI-ISA bridge) of the computer system of FIG. 1. The arbitration circuitry in both the MISC 118a and the MISC 118b is divided among two logic blocks: the PCI Distributed Arbiter (PDARB) 200 and the lower-level arbitration circuitry 202. The lower-level arbitration circuitry is further divided into three logic blocks: the Local PCI arbiter (PCIARB) 204, an SD Bus Arbiter (SDARB) 206, and an ISA bus arbiter 208.

The top level arbiter for PCI is the PDARB 200. The PDARB 200 essentially controls whether the MISC-L (188a) or MISC-E (188b) PCIARB 204 has access to the PCI bus 112. Although both the MISC-L 188a and the MISC-E 188b contain the PDARB 200 circuitry, the PDARB 200 is only active in the MISC-L 188a. The PDARB 200 in the MISC-E 188b is never active. Because this is accomplished by a wired input, however, different versions of the chip are not required in the laptop computer L and the expansion base E in the preferred embodiment.

The PCIARB 204 is preferably responsible for arbitration of the PCI bus 112 between a total of seven masters. The PCIARB 204 in the MISC-L 188a arbitrates between three general purpose masters, the CPU 100, a distributed DMA master and an EDMA master, and one ISA master. The PCIARB 204 in the MISC-E 188b arbitrates between five general purpose masters, one EDMA master and one ISA master. The general purpose masters include the video controller 114, the Cardbus interface 116, and the MPC 108. The MPC 108 acts as a PCI master when the CPU 100 is accessing the PCI bus 112, or as a PCI slave when a PCI device accesses system memory 106. As mentioned, the PCIARB 204 implements a least-recently-used (LRU) prioritization scheme. All grants (except ISA) have minimum grant timers associated with them that are configured via PCI configuration programming.

The SDARB 206 determines which device controls the SD/ISA data bus 138 or 140. The SDARB 206 works in conjunction with the ISA bus arbiter 208 to determine which master obtains control of the ISA data bus 138 or 140. Devices that can permissively control the SD bus include PCI masters (for PCI-to-ISA cycles), a refresh controller (not shown), the EDMA controller, the 8237 DMA controller and 16-bit ISA bus masters. ISA bus masters gain access to the ISA bus 138 or 140 through use of a cascaded DMA channel.

If the ISA data bus is not being requested, the SD arbiter "parks" PCI on the bus. This minimizes the latency for PCI to ISA cycles. The term "park" means that the arbiter has permission to assert a GNT* signal to a selected agent when no agent is currently using or requesting the bus. In this manner, the bus is immediately available to the default busmaster if it should require the use of bus (and no other higher priority request is pending). If the master that the bus is parked on subsequently requires access to the PCI bus, it need not assert its REQ* signal. Typically, an arbiter can select the default owner any way it wants or can choose not to park at all (effectively designating itself the default owner). Further details of the lower-level arbitration circuitry 202 can be found in the aforementioned U.S. patent application Ser. No. 08/398,366, now U.S. Pat. No. 5,596,729, entitled "Bus Master Arbitration Circuitry Having Multiple Arbiters."

Figure 3:
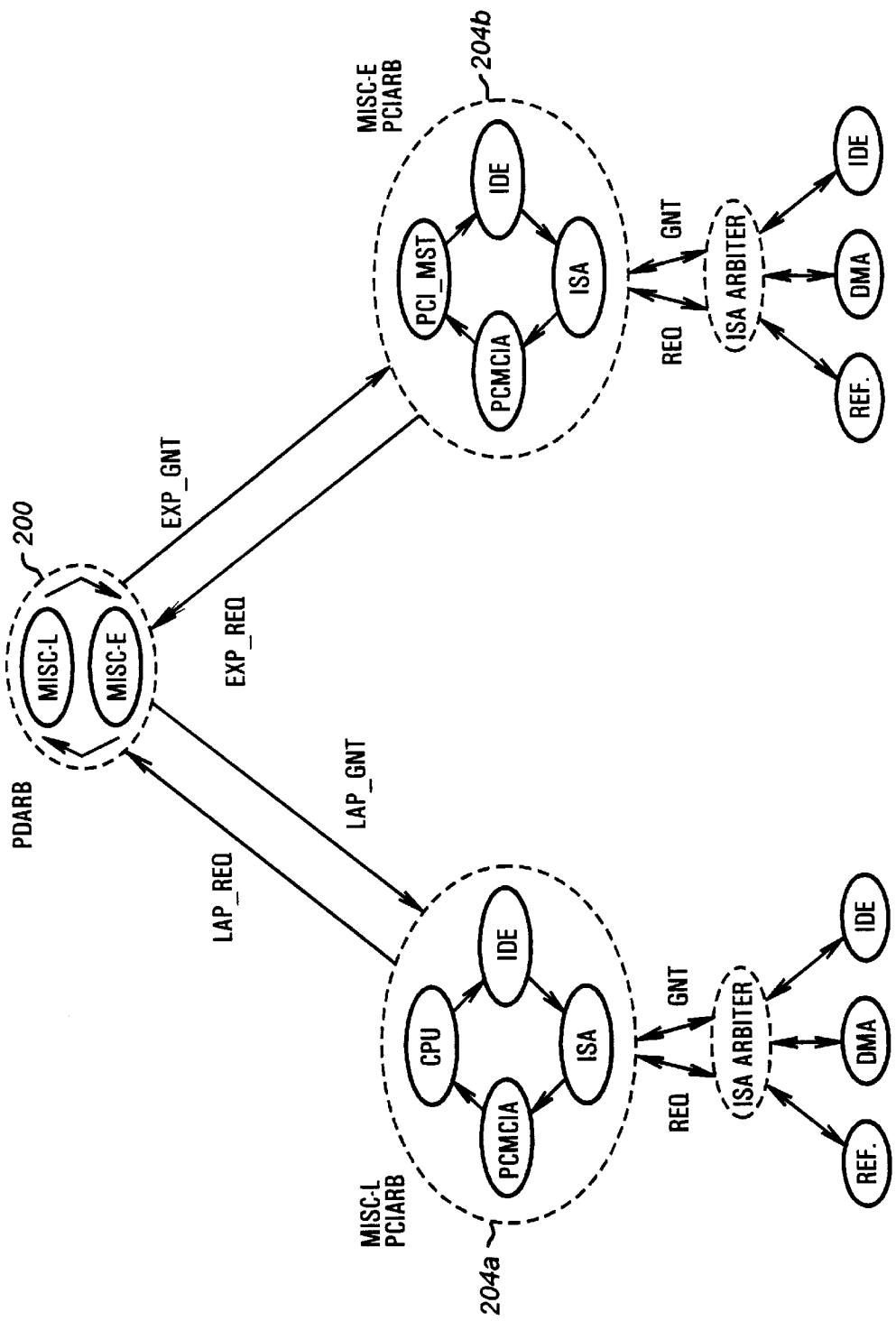
FIG. 3 is a flowchart depicting arbitration hierarchy according to the preferred embodiment.

A simplified flowchart depicting arbitration hierarchy according to the preferred embodiment is shown in FIG. 3. While the laptop computer L is docked, the top level arbiter PDARB 200 selects between the MISC-L PCIARB 204a and MISC-E PCIARB 204b, basically on a time multiplexed basis. The timing of grants is discussed more fully below. Lower level arbitration is generally handled on a least-recently-used (LRU) basis, but successful lower level arbitration must first be authorized by PDARB 200.

While the expansion base E and laptop computer L are undocked, PDARB 200 always grants access to the MISC-L 118a. Either MISC-L PCIARB 204a or MISC-E PCIAB 204b must receive a grant from PDARB 200 before it runs a cycle. The MISC-L 118a uses the laptop request and laptop grant signals LAP_REQ and LAP_GNT, which are internal to the MISC-L 118a. The MISC-E 118b uses the EXP_REQ and EXP_GNT signals which run between the two MISCs. These signals are discussed in more detail in conjunction with FIG. 4. In the preferred embodiment, these are the only two pins the arbiters use to communicate.

The MISC 118 supports three arbiter modes which function as follows:

Master Mode—The MISC 118 responds to the PCI REQ* signal and is the master arbiter. The master mode is the normal configuration for the MISC-L 118a. The internal LAP_REQ and LAP_GNT signals are provided to and by the PDARB 200 in this mode. It is contemplated that the MISC-E 118b can be programmed in master mode to provide standalone expansion base support in future products.

Slave Mode—The MISC 118 responds to the PCI REQ* signal and passes requests to the master arbiter. The slave mode is the normal configuration for the MISC-E 118b. The internal LAP_REQ and LAP_GNT signals are connected to the EXP_REQ and EXP_GNT pins when the MISC 118 is in slave mode. The PDARB 200 module is not active.

Idle Mode—The MISC 118 does not respond to the PCI REQ* signal. In PCI terminology, the idle state is defined as a clock cycle during which both FRAME* and IRDY* are deasserted. When the PCI bus 112 is idle, PDARB 200 activates the MISC-L PCIARB 204a, allowing it to park the CPU 100 during normal operation. Both the MISC-L 118a and MISC-E 118b can be put into idle mode during a hot docking sequence (hot docking refers to the laptop computer L being inserted into the expansion base E while both are turned on). During hot docking and reset, Idle mode forces all bus activity to cease and causes the bus to be parked at the MISC-L 118a. Idle mode can be entered from either Slave or Master Mode. Idle mode can also exit into either Slave or Master Mode. When an Arbiter Idle Request bit (not shown) is set by the MSIO 124, the following sequence commences:

1. The PDARB 200 overrides its grant timers and immediately puts on hold any active requests to both the master and slave PCIARB arbiters 204;
2. The PCIARB arbiters 204 function normally and are allowed to complete any minimum grant times;
3. The PCIARB arbiters 204 mask all requests and park themselves on the PCI bus 112; and
4. The PCIARB arbiters 204 assert their respective Arbiter Idle Status bits to the MSIO 124 to indicate that the bus is idle and ready for hot docking.

When the Arbiter Idle Request bit is cleared, the PDARB 200 negates the Arbiter Idle Status bit and simply grants bus control to the MISC-L 118a, resuming normal PCI bus 112 activity. The combination of modes allows support for hot docking and allows the MISC 118 to be used in both the laptop computer L and expansion base E.

Figure 4:
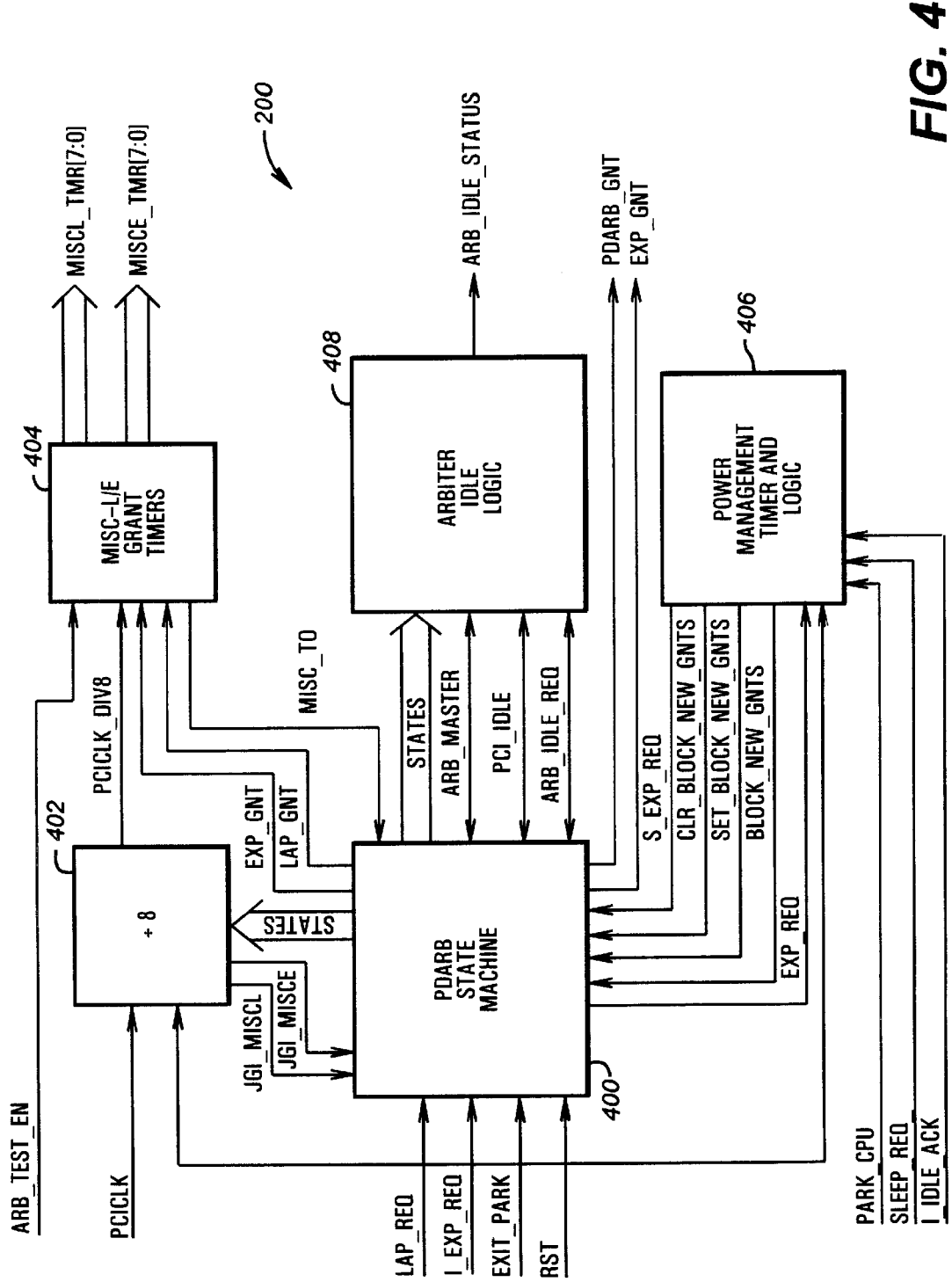
FIG. 4 is a block diagram detailing the top level distributed arbiter PDARB of FIGS. 2 and 3.

Referring now to FIG. 4, the PDARB 200 is shown in greater detail. The PDARB 200 contains a PDARB state machine 400, MISC-L and MISC-E grant timers 404, divide-by-8 circuitry 402 for generating the grant timer clock, power management timer and logic 406, and arbiter idle logic 408. The inputs and outputs to PDARB 200 function according to the following tables:

| OUTPUTS | |
| --- | --- |
| PDARB_GNT | grant to the local PCIARB 204a |
| EXP_GNT | MISC-L 118a grant to the expansion PCIARB 204b |
| MISCL_TMR [7:0] | 8-bit grant timer for the MISC-L PCIARB 204a |
| MISCE_TMR [7:0] | 8-bit grant timer for the MISC-E PCIARB 204b |
| ARB_IDLE_STATUS | informs the MSIO 124 that the arbiter is now idle (the MISC 118 is parked) |

| INPUTS | |
| --- | --- |
| LAP_REQ | request from the local PCIARB |
| EXP_GNT | the MISC-E 118b grant from the PDARB 200 in the MISC-L 118a |
| I_EXP_REQ | the MISC-L 118a request from the expansion PCI arbiter in the MISC-E 118b |
| PCI_IDLE | PCI bus is idle |
| ARB_MASTER | places the local PCIARB in master mode; enables the PDARB 200 state machine |
| ARB_IDLE_REQ | request from the MSIO 124 for arbiter to go to idle mode |
| I_IDLE_ACK | idle acknowledge signal IDLE_ACK from the MPC 108 |
| SLEEP_REQ_ | sleep request signal SLEEP_REQ_ from the MSIO 124 logic |
| ARB_TEST_EN | forces grant timer increment every PCICLK |
| EXIT_PARK | reloads timer when CPU cycle starts |
| PARK_CPU | indicates the CPU 100 is parked |
| PCICLK | PCI clock |
| RST | system-level reset |

The PDARB state machine 400 is responsible for determining which of the two PCIARB arbiters 204a or 204b has control of the PCI bus 112 following a request from either arbiter 204a or 204b. The PDARB state machine 400 also determines when the PCI bus is idle and no grants should be issued. Control signal inputs to the PDARB state machine 400 include LAP_REQ, I_EXP_REQ, EXIT_PARK, RST, ARB_MASTER, PCI_IDLE, and ARB_IDLE_REQ signals. The laptop computer L request signal LAP_REQ is asserted by the local PCIARB 204a to indicate that a laptop device is seeking control of the PCI bus 112. Similarly, the expansion base E request signal I_EXP_REQ is asserted when the expansion base E PCIARB 204b requests control of the PCI bus. The EXIT_PARK signal is used to reload timers when bus parking is exited. As indicated in the table above, the RST signal is used as a system-level reset.

The PDARB state machine 400 is enabled by the ARB_MASTER signal. This signal also places the local PCIARB 204a into master mode, and is typically only asserted in the MISC-L 118a. The PCI_IDLE signal is used to indicate that the PCI bus is idle, which is the majority of the time during normal computer operation. The ARB_IDLE_REQ signal is asserted when the MSIO 124 desires the arbiter to go into idle mode. Further details of the PDARB state machine 400 are provided below in FIGS. 5 and 6.

The divide-by-8 circuit 402 generates a version of the PCI clock whose frequency is reduced by a factor of eight. This clock, PCICLK_DIV8, is used by the MISC-L/E Grant Timers 404. The divide-by-8 circuit 402 is reset based on state signals received from the PDARB state machine 400, and provides the JGI_MISCL and JGI_MISCE signals to the PDARB state machine 400. Further details of the divide-by-8 circuitry 402 are shown in conjunction with FIG. 7.

The MISC-L/E Grant Timers block 404 is used to generate the 8-bit grant timer MISCL_TMR[7:0] for the MISC-L PCIARB 204 and the 8-bit grant timer MISCE_TMR[7:0] for the MISC-E PCIARB 204*b*. The timer block 404 is controlled by the grant signals EXP_GNT and LAP_GNT from the PDARB state machine 400. When either the MISC-L 118*a* or MISC-E 118*b* is granted control of the PCI bus 112, it is guaranteed to have its respective grant for a programmed duration as long as its request remains asserted. The MISC_TO signal, which is provided from the Grant Timer block 404 to the PDARB state machine 400, indicates that a grant timer has decremented to expiration following a reload. Details of the grant timer block 404 are provided in FIG. 8.

Also included in the PDARB 200 top level arbiter is a Power Management Timer and Logic block 406. This circuitry functions to block new grants from being issued when the EXIT_PARK signal is asserted under certain conditions. The signals S_EXP_REQ, CLR_BLOCK_NEW_GNTS, SET_BLOCK_NEW_GNTS, and BLOCK_NEW_GNTS are passed from the Power Management Timer and Logic block 406 to the PDARB state machine 400. Inputs to the Power Management Timer logic 406 include the signals EXP_REQ, EXIT_PARK, PARK_CPU, SLEEP_REQ_, I_IDLE_ACK. These signals are used to generate the grant blocking signals sent to the PDARB state machine 400. The power management timer and logic block 406 is detailed in FIG. 9 as discussed below.

An Arbiter Idle Logic block 408 is also included in PDARB 200. This block 408 generates a signal ARB_IDLE_STATUS that when true indicates to the MSIO 124 that the arbiter PDARB 200 is now idle (the MISC is "parked"). As detailed in FIG. 10, this block utilizes state signals from the PDARB state machine 400. The signals ARB_MASTER, PCI_IDLE, ARB_IDLE_REQ, and PDARB_GNT are also utilized to generate ARB_IDLE_STATUS.

Figure 5:
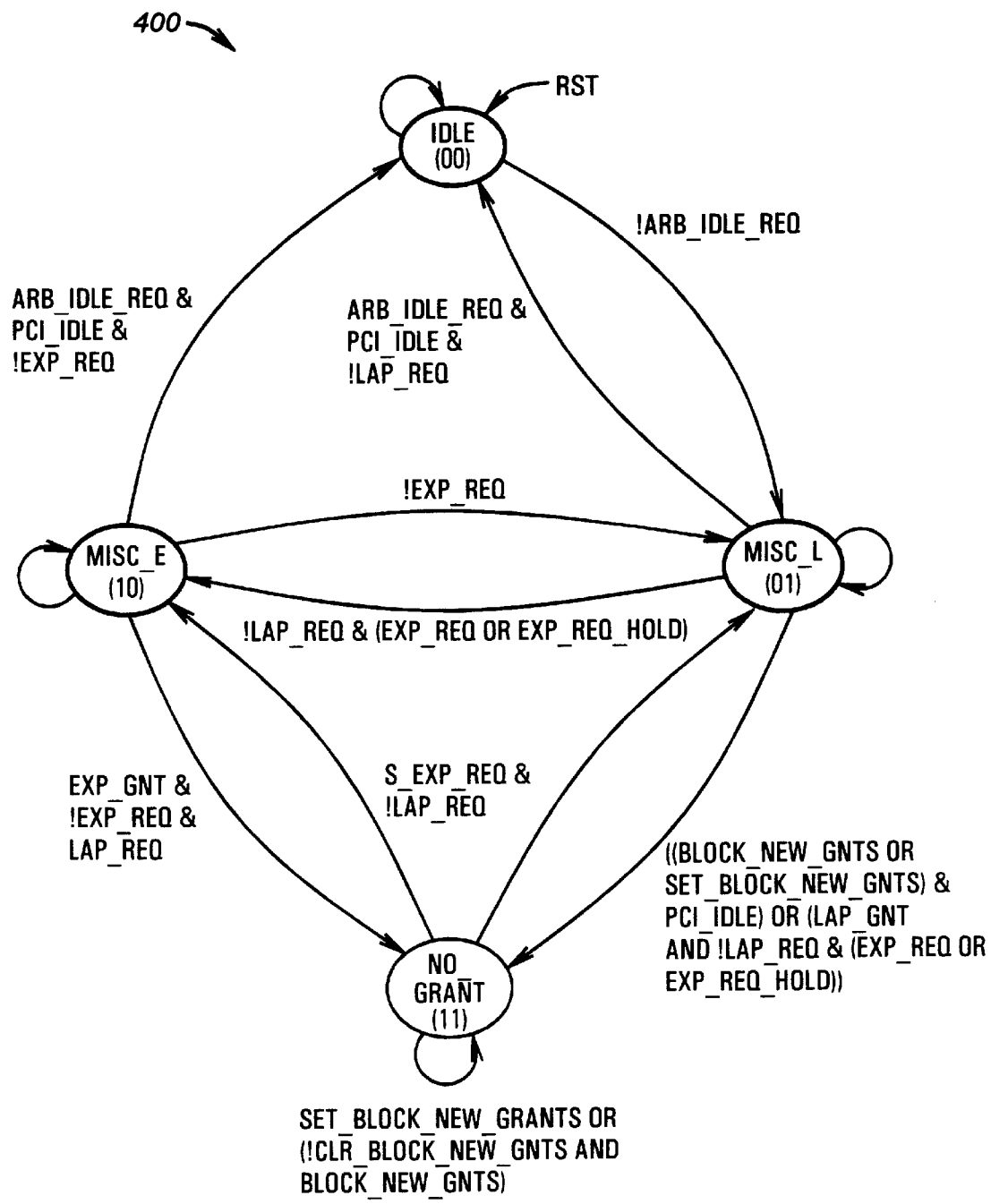
FIG. 5 is a state machine for determining which of the PCI-ISA bridges is granted control of the PCI bus.

The operation of the PDARB state machine 400 is illustrated in FIG. 5. Again, the PDARB state machine 400 determines whether the MISC 118*a* or 118*b* is granted control of the PCI bus. For purposes of this description "state" refers to the current state of the PDARB state machine 400 and an "!" before a signal indicates logical negation, such that the expression is high when the signal is low. Control begins at state IDLE upon receipt of the reset signal RST. The IDLE state indicates that no activity is currently occurring on the PCI bus 112. If the idle request signal is driven false by the MSIO 124, as indicated by !ARB_IDLE_REQ being true, control proceeds to state MISC_L and the signal LAP_GNT is asserted as discussed below in FIG. 6. Control of the PCI bus 112 is thereby granted to the PCIARB 204*a* (as it is contained within MISC-L 118*a*). If the signal ARB_IDLE_REQ is asserted, control remains in the state IDLE.

Control proceeds from state MISC_L to state IDLE if the signals ARB_IDLE_REQ and PCI_IDLE are asserted, while the signal LAP_REQ is not asserted. The PCI_IDLE signal indicates that the PCI bus 112 is idle. If the laptop computer L request signal LAP_REQ is not asserted, and either the expansion base E request signal EXP_REQ or the request hold signal EXP_REQ_HOLD is asserted, control proceeds from state MISC_L to state MISC_E. The EXP_REQ_HOLD signal is provided by the output of a J-K type flip flop 600 (FIG. 6).

Figure 6:
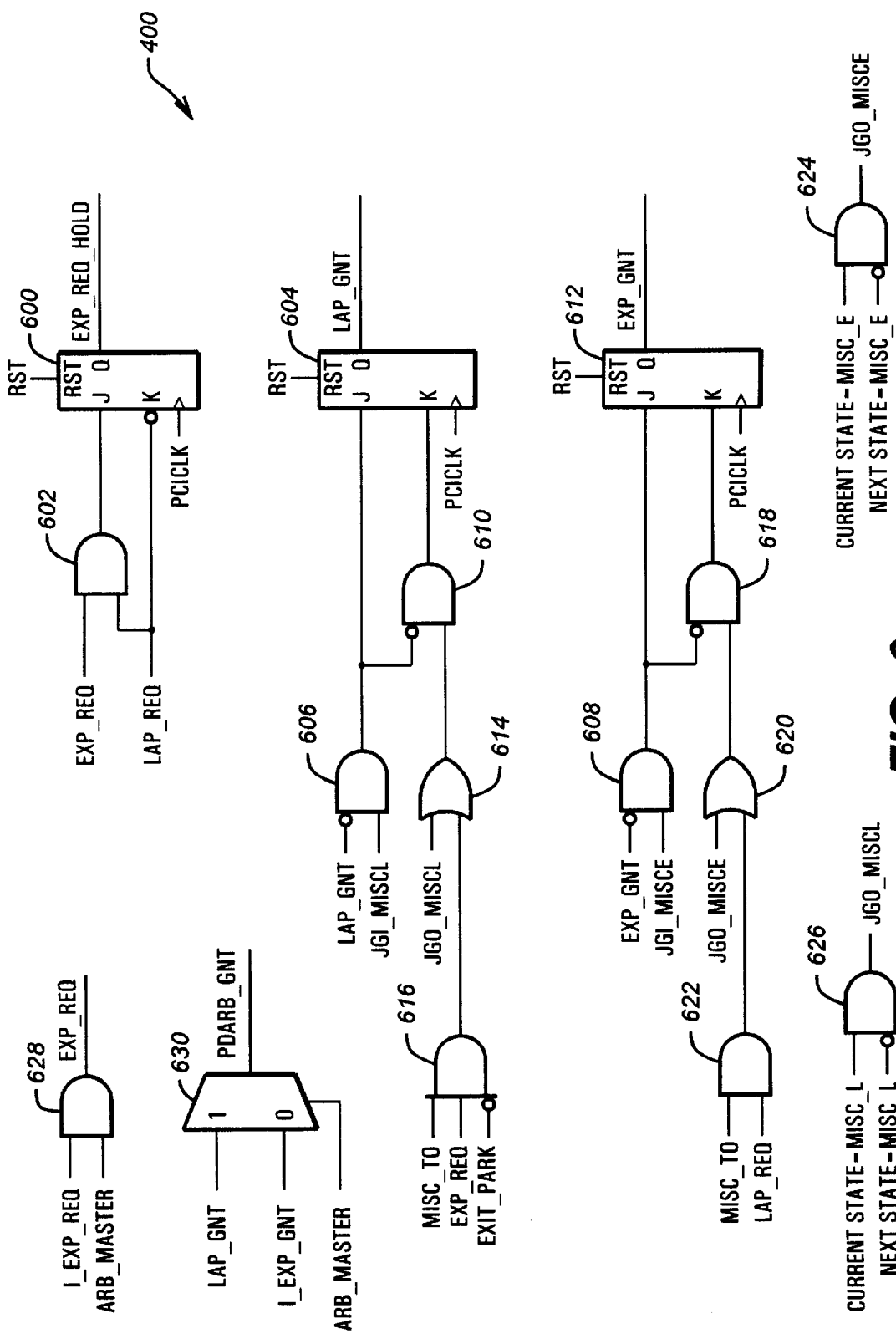
FIG. 6 is a schematic diagram of logic associated with the state machine of FIG. 5.

Referring to FIG. 6, the J input to the flip flop 600 is provided by the output of a two-input AND gate 602. The inputs to the AND gate 602 receive the EXP_REQ and LAP_REQ signals. The K input to the flip flop 600 is an inverted version of the LAP REQ signal. The EXP_REQ_HOLD signal is thereby asserted on the first rising edge of the PCICLK signal following assertion of both the EXP_REQ and LAP_REQ signals. In this manner, the MISC-E 118*b* is granted the bus if the EXP_REQ signal is asserted while the LAP_REQ signal is not, or the EXP_REQ and LAP_REQ signals were both asserted on the previous rising edge of the PCICLK signal and the LAP_REQ signal is subsequently deasserted. Stated another way, a transition from the MISC-L state to the MISC-E state occurs when the LAP_REQ signal is pulsed low by PCIARB 204*a* to confirm that control of the PCI bus 112 can be taken away following assertion of the EXP_REQ signal.

In the NO_GRANT state, no cycles are allowed to run on the PCI bus 112. Control proceeds from state MISC_L to state NO_GRANT under two conditions. A first condition occurs if either of the signals BLOCK_NEW_GNTS or SET_BLOCK_NEW_GNTS is asserted and the PCI_IDLE signal is asserted, indicating that the MPC 108 is asleep. In order to block grants on the first clock after the SLEEP_REQ signal is asserted, the SET_BLOCK_NEW_GNTS signal is included. This signal and the BLOCK_NEW_GNTS signal are generated by the power management timer and logic block 406 as detailed in FIG. 9. Control also proceeds from the MISC_L state to the NO_GRANT state if the LAP_GNT and either EXP_REQ or EXP_REQ_HOLD signals are asserted while the LAP_REQ signal is deasserted. This second condition is required because it is not desirable to change the LAP_GNT and EXP_GNT signals at the same time since this may allow grants to change while the PCI_IDLE signal is asserted.

Control returns from state MISC_E to state MISC_L whenever the expansion base E request signal EXP_REQ is deasserted. Thus, MISC_L is the default state when the expansion base E is not requesting the bus and the system is not in idle mode. If both ARB_IDLE_REQ and PCI_IDLE are asserted while EXP_REQ is deasserted, control proceeds from state MISC_E to state IDLE.

Control proceeds from state MISC_E to state NO_GRANT when the expansion base E grant signal EXP_GNT and the laptop computer L request signal LAP_REQ signal are asserted while the expansion base E request signal EXP_REQ is deasserted. Control returns from the NO_GRANT state to the MISC_E state when an S_EXP_REQ signal is asserted and the LAP_GNT signal is deasserted. The S_EXP_REQ signal is a synchronized version of the EXP_REQ signal provided at the output of a D-type flip flop 900 (FIG. 9) whose D input is the EXP_REQ signal. The flip flop 900 is clocked by the PCICLK signal. Control remains in the NO_GRANT state if either the SET_BLOCK_NEW_GRANTS signal is asserted or the CLR_BLOCK_NEW_GNTS signal is deasserted while the BLOCK_NEW_GNTS signal is asserted. Inclusion of the CLR_BLOCK_NEW_GNTS signal allows the enabling of grants to occur one clock sooner. All three of these signals are generated by the circuitry of FIG. 9 and are discussed more fully below. Once in the NO_GRANT state, if the conditions are not met for remaining in this state or for transition to the MISC_E state, control automatically passes to the MISC_L state.

Referring again to FIG. 6, further details of circuitry related to the PDARB state machine 400 are shown. As mentioned above in conjunction with FIG. 5, the signal EXP_REQ_HOLD affects transitions from the MISC_L state to the MISC_E state under certain circumstances. More specifically, if the EXP_REQ signal is deasserted before being granted (if, for example, it is asserted spuriously by a PCI master), this term assures that the state machine switches to the MISC_E state. If the request was not reasserted, control switches back to the MISC_L state and the laptop computer L grant signal LAP_GNT is reasserted. The signal EXP_REQ_HOLD is needed because an asserted request signal EXP_REQ clears a laptop grant signal LAP_GNT following a timeout by the grant timers (FIG. 8), but control never proceeds to the MISC_E state if EXP_REQ is no longer asserted.

The laptop grant signal LAP_GNT is provided at the output of a J-K type flip flop 604, which is clocked on the rising edge of the PCICLK signal. The J input of the flip flop 604 is connected to the output of an AND gate 606. One input of the AND gate 606 is connected to an inverted version of the signal LAP_GNT, while the other input is connected to the signal JGI_MISCL. An asserted signal JGI_MISCL (FIG. 7) indicates that the state machine has just transitioned into the MISC_L state. The K input to the flip flop 604 is connected to the output of an AND gate 610. One input of this AND gate 610 is connected to an inverted version of the output of the AND gate 606, while the other input is connected to the output of a two input OR gate 614. One input of the OR 614 is connected to the output of a three input AND gate 616 whose inputs include the grant timer timeout signal MISC_TO, the expansion base E request signal EXP_REQ, and an inverted version of the EXIT_PARK signal. The other input of the OR gate 614 is provided with a signal JGO_MISCL by the output of a two input AND gate 626. The output of this AND gate 626 is at a logic high level when the state machine 400 is currently in the MISC_L state while the next state is a state other than the MISC_L state. Thus, the flip flop 604 will assert the LAP_GNT signal for one clock cycle when the state machine first enters the MISC_L state, while the LAP_GNT signal is deasserted. The signal LAP_GNT is also deasserted following assertion of the reset signal RST.

The expansion base E grant signal EXP_GNT is provided by the non-inverting output of a J-K type flip flop 612. The J input of the flip flop 612 receives the output of an AND gate 608. One input of this AND gate 608 is connected to an inverted version of the expansion base E grant signal EXP_GNT, while the other input is connected to the signal JGI_MISCE (FIG. 7), which, when asserted, indicates that the state machine has just transitioned to the MISC_E state.

The K input to the flip flop 612 is provided by the output of an AND gate 618, whose inputs include an inverted version of the output of the AND gate 608 and the output of an OR gate 620. One input to the OR gate 620 is provided by the output of a two input AND gate 624. This input is asserted when the current state of the state machine 400 is MISC_E while the next state is any other state. The second input to the OR gate 620 is connected to the output of an AND gate 622, whose inputs include the grant timer timeout signal MISC_TO and the laptop computer L request signal LAP_REQ. The expansion base E grant signal EXP_GNT is therefore asserted when control proceeds to the MISC_E state when the EXP_GNT signal has been deasserted.

The expansion base E request signal EXP_REQ is provided by the output of a two input AND gate 628. One input of this AND gate 628 is connected to the signal I_EXP_REQ, which when asserted indicates a request from the PCIARB 204b in the MISC-E 118b. The EXP_REQ signal is recognized as the expansion base E request signal because the other input of the AND gate 628 is connected to the signal ARB_MASTER, which places the local PCIARB into master mode and enables the PDARB state machine 400.

The PDARB_GNT signal, indicating a grant to the local PCIARB 204a when active, is provided by the output of a 2:1 multiplexor 630. The 1 input to the multiplexor 630 receives the signal LAP_GNT, while the 0 input receives the signal I_EXP_GNT. The select input to the multiplexor 630 is driven by the ARB_MASTER signal, such that assertion of this signal indicates that the PDARB top level arbiter 200 is in master mode, and the LAP_GNT signal drives the PDARB_GNT signal. Deassertion of the ARB_MASTER signal indicates that the PDARB 200 in question is in slave mode, and the PDARB_GNT and I_EXP_GNT signals are equated.

Figure 7:
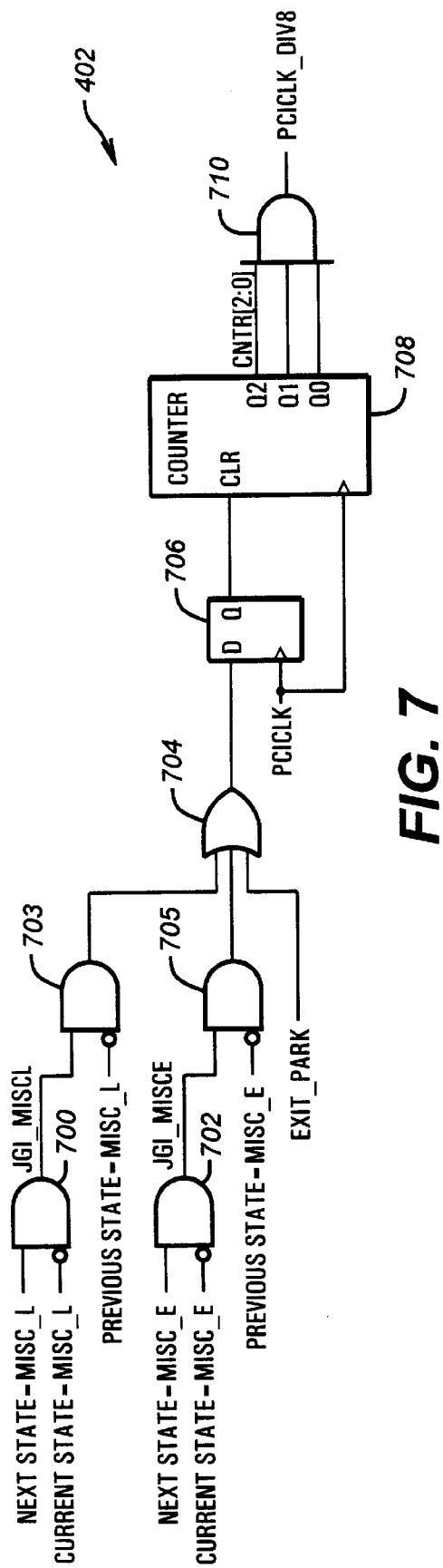
FIG. 7 is a schematic diagram of the divide-by-8 circuit of FIG. 4.

Moving to FIG. 7, divide-by-8 circuitry 402 is shown. This circuitry uses a three input AND gate 710 at the output of a counter 708 to provide a clock signal PCICLK_DIV8 used by the grant timers 404. The outputs CNTR[2:0] of the counter 708 are reset to zero when any of three inputs to an OR gate 704 are asserted. A first of these inputs is provided by the output of an AND gate 703. One input of the AND gate 703 is driven by an inverted version of a signal that is asserted when the previous state of the PDARB state machine 400 was the MISC_L state. The second input of the AND gate 703 is driven by the signal JGI_MISCL. The signal JGI_MISCL is provided by the output of an AND gate 700, which transitions high when the PDARB state machine 400 is about to transition into the MISC_L state (i.e., the next state is MISC_L, while the current state is not MISC_L).

A second input of the OR gate 704 is provided by the output of an AND gate 705. One input of the AND gate 705 is driven by an inverted version of a signal that is asserted when the previous state of the PDARB state machine 400 was the MISC_E state. The second input of the AND gate 705 is driven by the signal JGI_MISCE. The signal JGI_MISCE is proved by the output of an AND gate 702, and is asserted when the state machine PDARB 400 is prepared to transition into the MISC_E state. The third input to the OR gate 704 is driven by the signal EXIT_PARK, which indicates that the CPU 100 is exiting a parked condition.

The output of the OR gate 704 is latched by a D type flip flop 706 on the rising edge of the PCICLK signal. The non-inverting output Q of this flip flop 706 drives the asynchronous CLR input of counter 708. The counter is also clocked by the PCICLK signal. Hence, the counter 708 is reset on a new laptop computer L or expansion base E grant, or whenever the CPU 100 exits a parked condition. The counter bits CNTR[2:0] drive the inputs of the three input AND gate 710. The grant timers 404 clock signal PCICLK_DIV8 is provided by the output of this AND gate 710. The PCICLK_DIV8 signal is thereby driven high when the three counter output bits CNTR[2:0] all equal a logic level "1." This condition occurs following eight cycles of the system clock PCICLK.

Figure 8:
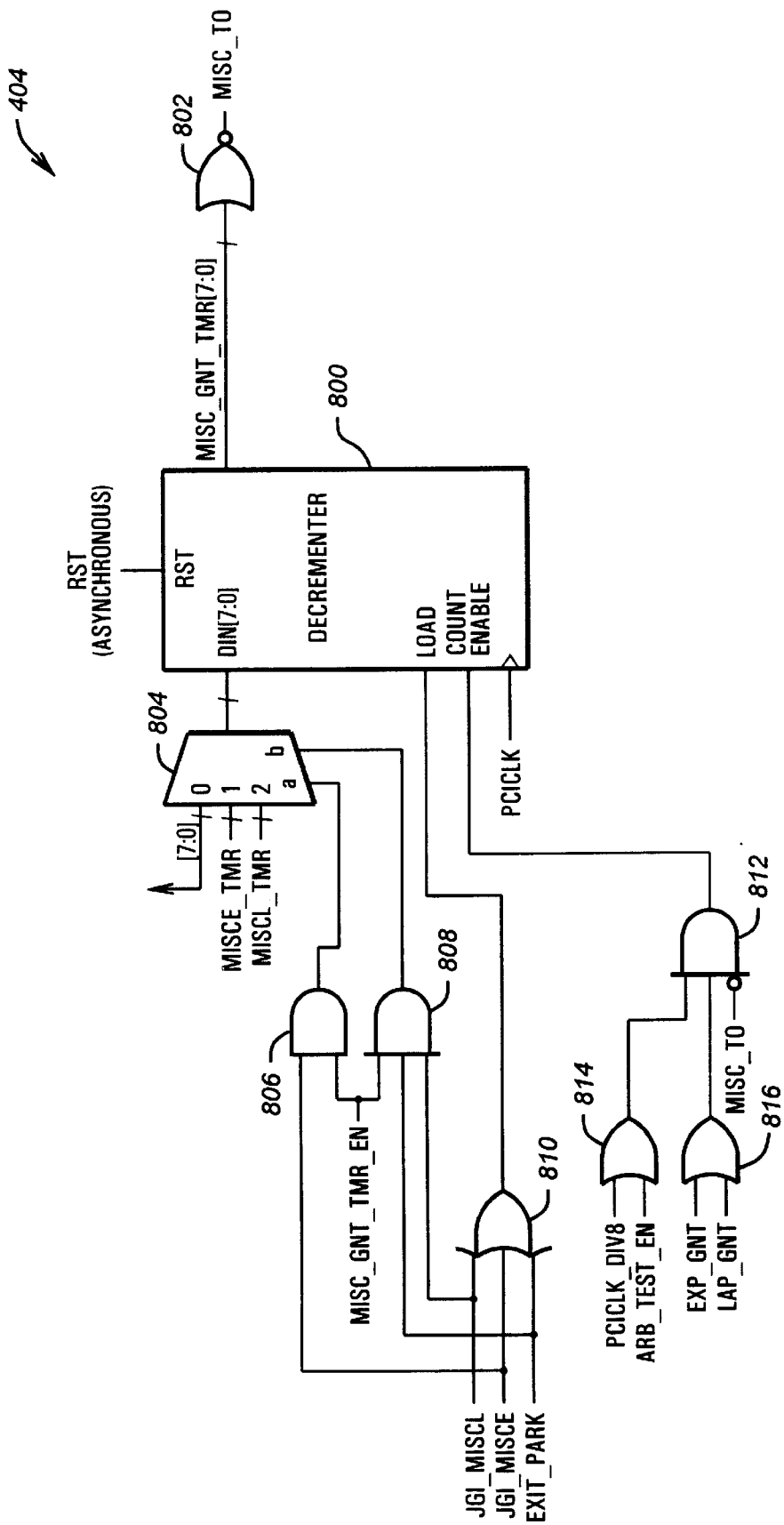
FIG. 8 is a detailed schematic diagram of the grant timer circuitry of FIG. 4.

A detailed schematic diagram of the grant timer circuitry 404 is shown in FIG. 8. The PDARB uses two grant timers to arbitrate between the MISC-L 118a and the MISC-E 118b (or, more precisely, one timer that is loaded with two values). The MISC-L 118a or MISC-E 118b is guaranteed to have its respective grant for the time programmed as long as the appropriate request signal remains asserted. As an example, consider the following sequence:

1. The MISC-E 118b is granted the PCI bus. Its grant timer begins counting.
2. While the MISC-E 118b is running cycles, the MISC-L 118a asserts the LAP_REQ signal to the PDARB 200.
3. The MISC-E 118b finishes before its timer expires and negates the EXP_REQ signal.

4. The PDARB 200 will negate the EXP_GNT signal on the next clock and give the bus to the MISC-L 118a. The MISC-E grant timer is cleared.

To provide fair arbitration, the timer is ideally programmed to allow each master in the MISC-L 118a or MISC-E 118b to gain access to the bus once during a grant to PCIARB 204a or 204b, respectively. This timing can be approximated by:

MISC Grant Timer=(# of local masters)×(average grant time per master).

It is contemplated that any value could be used to favor one group of masters over another. For example, the MISC-E 118b may need a larger grant value since it could be servicing ISA masters and/or DMA. Care must be taken when programming this timer. Values less than the length of the longest PCI cycles could cause hang conditions. Values too large could cause excessive latency for some devices. Currently, it appears approximately 3 us would be an appropriate value. Programming registers and logic have been omitted for sake of clarity, but timers would preferably be set on system initialization using PCI configuration cycles.

When either the MISC-L 118a or MISC-E 118b grant timer expires or times-out, the MISC_TO signal is asserted to the PDARB state machine 400. Upon time-out, the PDARB nerves the appropriate grant signal. The MISC-L 118a or MISC-E 118b then negates its request for at least one clock cycle to signal the PDARB state machine 400 to change state and issue the new grant to the appropriate MISC 118. The request handshake back to the PDARB state machine 400 is required to allow masters with active minimum grant timers to complete their grant time or allow DMA/ISA bus masters to finish.

The output MISC_GNT_TMR[7:0] of a decrementing counter 800 is connected to the inputs of an eight input NOR gate 802, whose output provides the grant timer timeout signal MISC_TO to the PDARB state machine 400. When all counter output bits MISC_GNT_TMR[7:0] are equal to a logic level "0", the grant or timeout signal MISC_TO is thereby asserted. In the disclosed embodiment, the data in inputs DIN[7:0] of the decrementing counter 800 are tied to the output of a multiplexor 804. The multiplexor 804 is capable of loading the decrementing counter 800 with one of three separate values as determined by the select bits a and b.

When both select bits a and b are at a logic low level, the "0" input of the multiplexor 804 is selected for provision to the DIN[7:0] inputs of the decrementing counter 800. It should be noted that the 0, 1, and 2 inputs to the multiplexor are 8 bit signal lines. In the disclosed embodiment, all bits of the 0 input of the multiplexor 804 are coupled to the positive supply rail, such that the decrementing counter 804 is loaded with all "1's" when the 0 input is selected and the LOAD input of the decrementing counter 804 is asserted. The 1 input of the multiplexor 804 is driven by an 8 bit grant timer value MISCE_TMR for grants to the MISC-E 118b, while the 2 input of the multiplexor 804 is driven by an 8 bit grant timer value MISCL_TMR for grants to the MISC-L 118a. MISCE_TMR is provided to the DIN[7:0] input of the decrementing counter 800 when the select bit a is at a logic high level and the select bit b is at a logic low level. Similarly, MISCL_TMR is provided to the DIN[7:0] input of the decrementing counter 800 when the select bit a is at a logic low level and the select bit b is at a logic high level.

The select bit a of the multiplexor 804 receives the output of an AND gate 806. Inputs to this AND gate 806 include the grant timer enable signal MISC_GNT_TMR_EN and the signal JGI_MISCE, which indicates that the PDARB state machine 400 just entered the MISC_E state. The decrementing counter 800 is therefore loaded with the timer value MISCE_TMR when the PDARB state machine 400 enters the MISC_E state and the grant timer 404 is enabled.

The select bit b of the multiplexor 804 receives the output of a three input AND gate 808. The inputs to the AND gate 808 are driven by the signals MISC_GNT_TMR_EN, JGI_MISCL and EXIT_PARK. The decrementing counter 800 is therefore loaded with the timer value MISCL_TMR if the PDARB state machine 400 enters the MISC_L state and the grant timer 404 is enabled. The timer value MISCL_TMR is also used when the CPU 100 exits a parked condition (and grants to the MISC_L 118a by default) while the grant timer 404 is enabled.

The LOAD input of the decrementing counter 800 is tied to the output of a three input OR gate 810. The inputs to the OR gate 810 are driven by the EXIT_PARK, JGI_MISCE and JGI_MISCL signals. When any of these signals is asserted, the decrementing counter 800 is loaded with the timer value present at its DIN[7:0] input.

The output of a three input AND gate 812 is connected to the COUNT ENABLE input of the decrementing counter 800. When this input is asserted, decrementing of the grant timer is enabled. One input of the AND gate 812 is driven by the output of an OR gate 814 whose inputs are connected to the PCICLK_DIV8 and ARBTEST_EN signal lines. A second input of the AND gate 812 is driven by the output of another OR gate 816, whose inputs are in turn driven by the signals EXP_GNT and LAP_GNT. The third input of the AND gate 812 is driven by an inverted version of the MISC_TO signal.

Thus, three conditions are required in order to enable clocking of the decrementing counter 800. First, either the expansion base E grant signal EXP_GNT or the laptop computer L grant signal LAP_GNT must be asserted. Second, either the PCICLK_DIV8 (ideally asserted every eighth PCICLK signal by the circuitry of FIG. 7) or ARB_TEST_EN signal must be asserted. As mentioned, the ARB_TEST_EN signal forces the grant timer 800 to increment every PCICLK and is used for testing purposes. Finally, the timeout signal MISC_TO must be deasserted. If all three conditions are met, the decrementing counter 800 is enabled.

Figure 9:
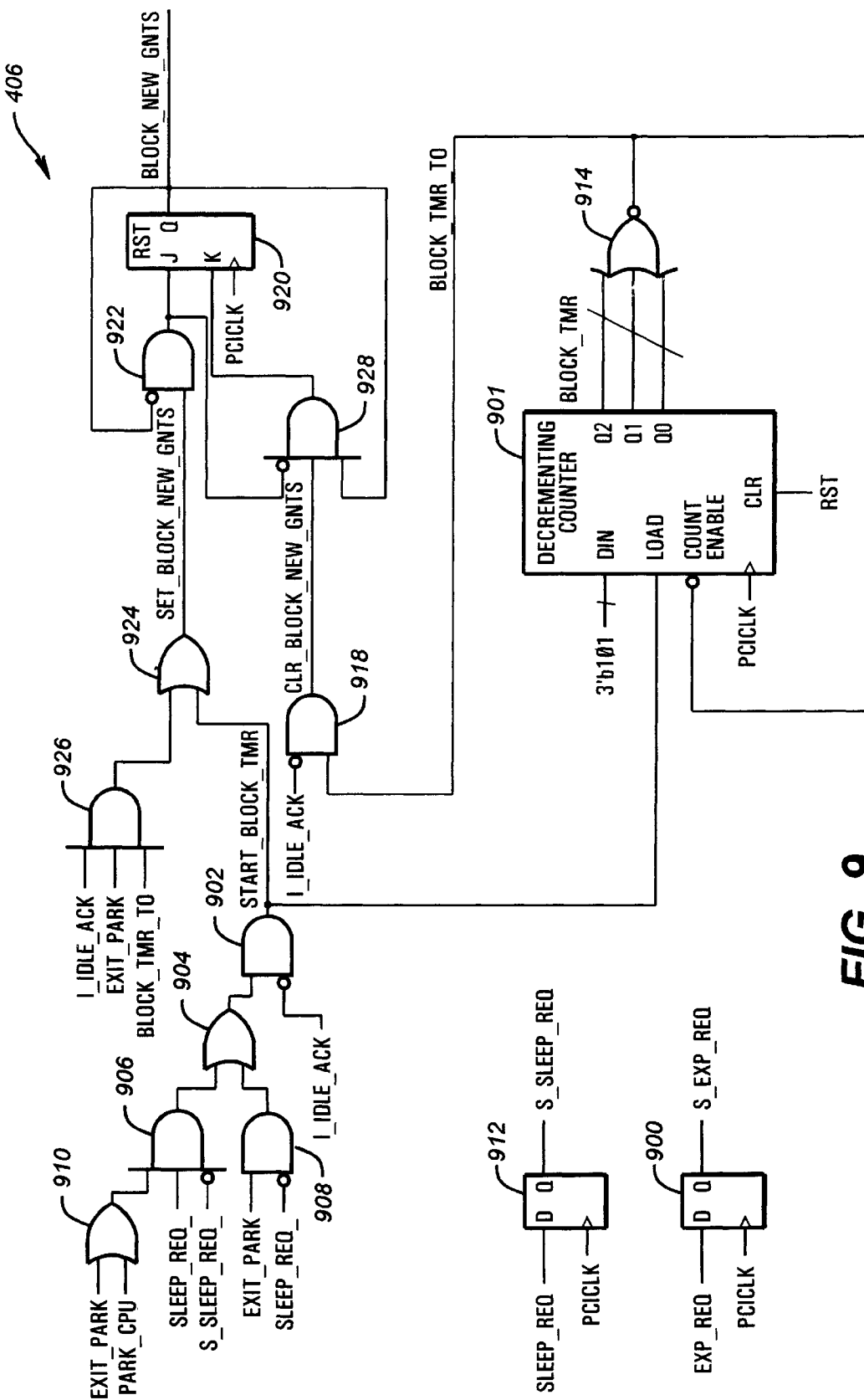
FIG. 9 is a detailed schematic diagram of the power management timer and logic block of FIG. 4.

Referring now to FIG. 9, details of the power management timer and logic block 406 are shown. This logic blocks new grants from being issued when park is exited under the following three conditions: (1) the IDLE_ACK signal is asserted; (2) the SLEEP_REQ_ signal is asserted but the IDLE_ACK signal has not yet been asserted; or (3) the SLEEP_REQ_ signal is asserted and negated without the IDLE_ACK signal asserted. For conditions (2) and (3) grants must be blocked for seven clock periods of PCICLK because the MPC 108 clock is stopped, it is driving the bus (parked), and it needs seven clocks to start its internal clock and therefore remove itself from park. Grants need not be blocked for condition (1) above because the MPC 108 does not negate the IDLE_ACK signal unless its clock is running.

To this end, if the LOAD input to a decrementing counter 901 is asserted high, the binary value 101 is loaded at the DIN input. The signal START_BLOCK_TMR, which drives the LOAD input of counter 901, is provided by the output of an AND gate 902. An inverted version of the signal I_IDLE_ACK, which is an idle acknowledgement signal sent by the MPC 108, drives one input of the AND gate 902.

The other input of the AND gate 902 is driven by the output of an OR gate 904, whose inputs are driven by a three input AND gate 906 and a two input AND gate 908. One input of the AND gate 906 is driven by the output of an OR gate 910, whose two inputs are driven by EXIT_PARK and PARK_CPU. The other two inputs to the AND 906 are driven by the signals SLEEP_REQ_ and S_SLEEP_REQ_. The SLEEP_REQ_ signal is a sleep request input from power management logic of the MSIO 124. The S_SLEEP_REQ_ signal is a synchronized version of this signal provided by the output of D type flip flop 912 whose input is the SLEEP_REQ_ signal. This flip flop 912 is clocked by the PCICLK signal.

The inputs to the AND gate 908 are driven by the EXIT_PARK signal and an inverted version of the SLEEP_REQ_ signal. The logic gates 902, 904, 906, 908, and 910 account for conditions (2) and (3) above. Thus, when conditions (2) and (3) are encountered, the START_BLOCK_TMR signal is asserted and counter 901 is loaded with the binary value 101. The decrementing counter 901 is clocked by the PCICLK signal, while an inverted version of the signal BLOCK_TMR_T0 is used to enable the counter. The latter signal is driven by the output of a three input NOR gate 914. The three inputs to this NOR gate 914 are the Q0, Q1 and Q2 outputs of the counter 901. Once the counter 901 has been activated by the signal START_BLOCK_TMR, Q0 through Q2 are decremented to the binary value 000 following seven cycles of the PCICLK clock signal. The output of the NOR gate 914 is then asserted and the clock to the counter 901 is deactivated.

The signals CLR_BLOCK_NEW_GNTS, SET_BLOCK_NEW_GNTS, and BLOCK_NEW_GNTS are communicated from the power management timer and logic block 406 to the PDARB state machine 400 (FIG. 5). The signal BLOCK_NEW_GNTS is provided by the non-inverting input of a J-K type flip flop 920. This flip flop is clocked by the PCICLK signal. The J input to the flip flop 920 is driven by the output of an AND gate 922 whose inputs are an inverted version of the BLOCK_NEW_GNT signal and the signal SET_BLOCK NEW_GNTS. The signal SET_BLOCK_NEW_GNTS is provided by the output of a two input OR gate 924. The inputs of this OR gate 924 receive the aforementioned signal START_BLOCK_TMR, as well as the output of a three input AND gate 926. The AND gate 926 inputs are driven by the signals I_IDLE_ACK, EXIT_PARK, and BLOCK_TMR_T0. Assertion of either BLOCK_NEW_GNTS or SET_BLOCK_NEW_GNTS while the PCI bus is idle causes the state machine 400 to transition from the MISC_L state to the NO_GRANT state. The SET_BLOCK NEW_GNTS signal is asserted whenever the counter 901 is loaded or the signals I_IDLE_ACK, EXIT_PARK, and BLOCK_TMR_T0 are asserted at the same time.

The signal CLR_BLOCK_NEW_GNTS is driven by the output of an AND gate 918 whose inputs include an inverted version of the signal I_IDLE_ACK and the BLOCK_TMR_T0 signal. Thus, the clear block new grant signal CLR_BLOCK_NEW_GNTS is asserted following a block timer timeout while the I_IDLE_ACK signal is deasserted. The CLR_BLOCK_NEW_GNTS signal, which is used to clear the output of the flip flop 920 (negate the BLOCK_NEW_GNTS signal), is connected to one input of a three AND gate 928. Other inputs to this AND gate 928 include an inverted version of the output of the AND gate 922 and the signal BLOCK_NEW_GNTS. Thus, the K input of the flip flop 920 is at a high logic level only when the J input is at a logic low level and the output BLOCK_NEW_GNTS signal is asserted.

Figure 10:
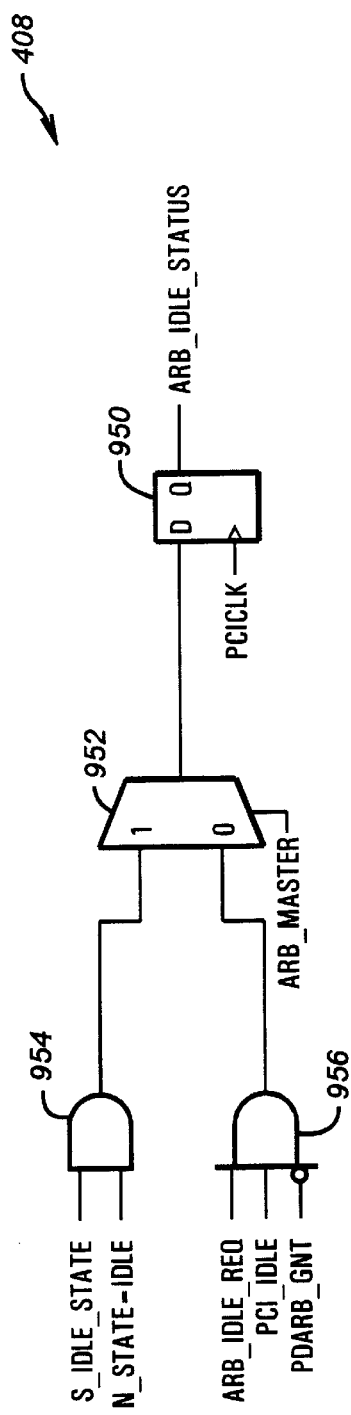
FIG. 10 is a schematic diagram of the arbiter idle logic block of FIG. 4.

Details of the arbiter idle logic block 408 are provided by FIG. 10. This circuitry produces the signal ARB_IDLE_STATUS, which informs the MSIO 124 that the arbiter is in the idle state (MISC-L 118a is parked on the bus) when asserted. The ARB_IDLE_STATUS signal is synchronized to the PCICLK signal by a D-type flip flop 950. The D input to this flip flop 950 is connected to the output of a two input multiplexor 952. The 1 input to this multiplexor 952 is connected to the output of an AND gate 954, while the 0 input is connected to the output of a three input AND gate 956. The signals S_IDLE_STATE and N_STATE=IDLE drive the inputs of the AND gate 954. The inputs of the AND gate 956 are driven by the signals ARB_IDLE_REQ, PCI_IDLE, and an inverted version of the PDARB_GNT signal. The select input of the multiplexor 952 is driven by the signal ARB_MASTER. As mentioned, the ARB_MASTER signal is only asserted in the laptop MISC-L 118a. Thus, the ARB_IDLE_STATUS signal can only be asserted in a MISC-L 118b when the signal EXP_GNT is negated. In the MISC-L 118a, the ARB_IDLE_STATUS signal is delayed by two clocks in order to allow the CPU 100 to stop driving after its grant has been removed.

Thus, a top level arbiter for determining whether a laptop PCI arbiter or an expansion base PCI arbiter has access to the PCI bus has been described. Each PCI arbiter must receive a grant from the top level arbiter before it runs a cycle. While the laptop computer is docked, the top level arbiter selects between the PCI arbiters on an essentially time multiplexed basis. While the expansion base and laptop computer are undocked, the top level arbiter always grants bus access to the laptop PCI arbiter. Only request and grant signals need be communicated between the top level arbiter and the PCI arbiter of the expansion base unit. A distributed arbitration scheme according to the invention thereby simplifies overall arbitration and reduces complexity in the interface between the laptop computer and the expansion base.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A top level arbiter circuit for use in a computer system which includes a first portion having a first bus and a first arbiter for arbitrating bus control requests from devices coupled to the first bus, and a second portion having a second bus and a second arbiter for arbitrating bus control requests from devices coupled to the second bus, the first and second portions of the computer system further including an interface for forming an extended bus of the first bus and the second bus, said top level arbiter comprising:

a first electrical interface for receiving bus control requests from the first arbiter of the first portion;

a second electrical interface for receiving bus control requests from the second arbiter of the second portion;

a prioritizing circuit responsive to said first and second electrical interfaces for prioritizing access to the extended bus by said first arbiter of said first portion and said second arbiter of said second portion;

a third electrical interface responsive to said prioritizing circuit for selectively granting access to the extended bus to said first arbiter in said first portion; and a fourth electrical interface responsive to said prioritizing circuit for selectively granting access to the extended bus to said second arbiter in said second portion.

2. The top level arbiter of claim 1, wherein each of said first electrical interface for receiving bus control requests from said first arbiter and said second electrical interface for receiving bus control requests from said second arbiter consists essentially of a request line, and wherein each of said third electrical interface for selectively granting access to the extended bus to said first arbiter and said fourth electrical interface for selectively granting access to the extended bus to said second arbiter consists essentially of a grant line.

3. The top level arbiter of claim 1, wherein each of said first electrical interface for receiving bus control requests from said first arbiter and said second electrical interface for receiving bus control requests from said second arbiter consists essentially of a request line, and wherein each of said third electrical interface for selectively granting access to the extended bus to said first arbiter and said fourth electrical interface for selectively granting access to the extended bus to said second arbiter consists essentially of a grant line.

4. A method for determining arbiter priority in a computer system which includes at least a first portion having a first bus and a first arbiter for arbitrating bus control requests from devices coupled to the first bus, and a second portion having a second bus and a second arbiter for arbitrating bus control requests from devices coupled to the second bus, the first and second portions of the computer system further including an interface for forming a extended bus of the first bus and the second bus, the method comprising the steps of:
    monitoring the first arbiter of the first portion for requests to allow a potential bus master access to the extended bus;
    monitoring the second arbiter of the second portion for requests to allow a potential bus master access to the extended bus; and
    selectively prioritizing and granting detected requests for access to the extended bus on a predominantly time multiplexed basis.

5. The method of claim 1, wherein said step of selectively prioritizing and granting requests comprises the steps of:
    establishing a predetermined grant time for each of the first arbiter of the first portion and the second arbiter of the second portion;
    initiating a counter to allow access to the extended bus for said predetermined grant time following a detected request for access to the extended bus; and
    repeating said step of initiating a counter for detected requests received during or shortly after periods in which another arbiter is granted access to said extended bus.

6. A top level arbiter according to claim 1, wherein the extended bus of the computer system is a Peripheral Component Interface (PCI) bus.

7. A computer system, comprising:
    a first portion, comprising:
        a first bus;
        a first arbiter electrically coupled to said first bus for arbitrating bus control requests from devices coupled to said first bus;
    a second portion, comprising:
        a second bus;
        a second arbiter electrically coupled to said second bus for arbitrating bus control requests from devices coupled to said second bus;
        an interface for functionally connecting said first bus of said first portion to said second bus of said second portion to form a extended bus; and
    a top level arbiter, said top level arbiter comprising:
        a first electrical interface for receiving bus control requests from said first arbiter of said first portion;
        a second electrical interface for receiving bus control requests from said second arbiter of said second portion;
        a prioritizing circuit responsive to said first and second electrical interfaces for prioritizing access to said extended bus by said first arbiter of said first portion and said second arbiter of said second portion;
        a third electrical interface responsive to said prioritizing circuit for selectively granting access to said extended bus to said first arbiter in said first portion; and
        a fourth electrical interface responsive to said prioritizing circuit for selectively granting access to said extended bus to said second arbiter in said second portion.

8. A method for determining arbiter priority in a computer system which includes at least a first portion having a first bus and a first arbiter for arbitrating bus control requests from devices coupled to the first bus, and a second portion having a second bus and a second arbiter for arbitrating bus control requests from devices coupled to the second bus, the first and second portions of the computer system further including an interface for forming a extended bus of the first bus and the second bus, the method comprising the steps of:
    monitoring the first arbiter of the first portion for requests to allow a potential bus master access to the extended bus;
    monitoring the second arbiter of the second portion for requests to allow a potential bus master access to the extended bus; and
    selectively prioritizing and granting detected requests for access to the extended bus on a predominantly time multiplexed basis.

9. The method of claim 8, wherein said step of selectively prioritizing and granting requests comprises the steps of:
    establishing a predetermined grant time for each of the first arbiter of the first portion and the second arbiter of the second portion;
    initiating a counter to allow access to the extended bus for said predetermined grant time following a detected request for access to the extended bus; and
    repeating said step of initiating a counter for detected requests received during or shortly after periods in which another arbiter is granted access to said extended bus.

10. The method of claim 9, further including the step of allowing either the first arbiter or the second arbiter to park either itself or a computer system component on the extended bus when the computer system is in an idle state.

11. A computer system, comprising:
    a first portion, comprising:
        a first bus;
        a first arbiter electrically coupled to said first bus for arbitrating bus control requests from devices coupled to said first bus;
    a second portion, comprising:
        a second bus;
        a second arbiter electrically coupled to said second bus for arbitrating bus control requests from devices coupled to said second bus;
        an interface for functionally connecting said first bus of said first portion to said second bus of said second portion to form a extended bus; and a top level arbiter, said top level arbiter comprising:
- a first electrical interface for receiving bus control requests from said first arbiter of said first portion;
- a second electrical interface for receiving bus control requests from said second arbiter of said second portion;
- a prioritizing circuit responsive to said first and second electrical interfaces for prioritizing access to said extended bus by said first arbiter of said first portion and said second arbiter of said second portion;
- a third electrical interface responsive to said prioritizing circuit for selectively granting access to said extended bus to said first arbiter in said first portion; and
- a fourth electrical interface responsive to said prioritizing circuit for selectively granting access to said extended bus to said second arbiter in said second portion.

12. The computer system of claim 11 wherein said top level arbiter prioritizing circuit includes a grant timer for granting control on an essentially time multiplexed basis.

13. The top level arbiter of claim 11, wherein each of said first electrical interface for receiving bus control requests from said first arbiter and said second electrical interface for receiving bus control requests from said second arbiter consists essentially of a request line, and wherein each of said third electrical interface for selectively granting access to the extended bus to said first arbiter and said fourth electrical interface for selectively granting access to the extended bus to said second arbiter consists essentially of a grant line.

14. The computer system of claim 11, wherein said first portion of said computer system is a laptop computer and said second portion of said computer system is an expansion base.

15. The computer system of claim 14 wherein said extended bus is a Peripheral Component Interface (PCI) bus.

16. The computer system of claim 14 wherein said first portion includes a Peripheral Component Interface (PCI) bus and either an Industry Standard Architecture (ISA) bus or an Extended Industry Standard Architecture (EISA) bus, and wherein said second portion includes a PCI bus and either an ISA or EISA bus.

17. The computer system of claim 11 wherein said first arbiter and said second arbiter utilize a modified least-recently-used arbitration scheme.

18. The computer system of claim 11 wherein each of said first and second portions includes said top level arbitration circuitry, and wherein said top level arbitration circuitry is active in only one of said first portion or said second portion while said first and second portions are functionally connected via said extended bus.

* * * * *

UNITED STATES PATENT AND TRADEMARK OFFICE
CERTIFICATE OF CORRECTION

PATENT NO. : 5,954,809
DATED : September 21, 1999
INVENTOR(S) : Dwight D. Riley et al.

It is certified that error appears in the above-identified patent and that said Letters Patent is hereby corrected as shown below:

Column 19,
Line 1, change claim 2 as follows:
2. The top level arbiter of claim 1, wherein said prioritizing circuit comprises a grant timer for granting control on an essentially time multiplexed basis.

Line 20, change claim 4 as follows:
4. A top level arbiter according to claim 1, wherein the first portion of the computer system is a laptop computer and wherein the second portion of the computer system is an expansion base.

Line 39, change claim 5 as follows:
5. The top level arbiter of claim 4, wherein said top level arbiter always grants bus access to said first arbiter of the laptop computer when said laptop computer is detached from the expansion base.

Line 54, change claim 7 as follows:
7. A top level arbiter according to claim 1, wherein each of the first and second portions of the computer system include a Peripheral Component Interface (PCI) bus and either an Industry Standard Architecture (ISA) bus or an Extended Industry Standard Architecture (EISA) bus.

Signed and Sealed this

Twenty-sixth Day of October, 2004

JON W. DUDAS
*Director of the United States Patent and Trademark Office*